United States Patent
Liu et al.

(10) Patent No.: US 10,162,314 B2
(45) Date of Patent: Dec. 25, 2018

(54) TWO-WAY ARCHITECTURE

(71) Applicants: SAGEM DEFENSE SECURITE, Boulogne-Billancourt (FR); TURBOMECA, Bordes (FR)

(72) Inventors: Celine Liu, Boulogne-Billancourt (FR); Nicolas Marti, Boulogne-Billancourt (FR); Stephen Langford, Pau (FR)

(73) Assignees: SAFRAN ELECTRONICS AND DEFENSE, Boulogne-Billancourt (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/508,455

(22) PCT Filed: Sep. 4, 2015

(86) PCT No.: PCT/FR2015/052344
§ 371 (c)(1),
(2) Date: Mar. 2, 2017

(87) PCT Pub. No.: WO2016/034825
PCT Pub. Date: Mar. 10, 2016

(65) Prior Publication Data
US 2017/0277151 A1    Sep. 28, 2017

(30) Foreign Application Priority Data
Sep. 5, 2014 (FR) ...................... 14 58354

(51) Int. Cl.
*G05B 9/03* (2006.01)
*G05B 19/048* (2006.01)
(Continued)

(52) U.S. Cl.
CPC ............. *G05B 9/03* (2013.01); *G05B 19/048* (2013.01); *G06F 11/2028* (2013.01);
(Continued)

(58) Field of Classification Search
CPC ................... B64D 13/503; G05B 9/03; G05B 2219/24182–2219/24184;
(Continued)

(56) References Cited

U.S. PATENT DOCUMENTS

2008/0205416 A1    8/2008  DeChiara
2011/0270471 A1*   11/2011 Andre ....................... G05B 9/03
                                                            701/3
(Continued)

FOREIGN PATENT DOCUMENTS

EP          0742507 A1   11/1996
EP          1695886 A1    8/2006
(Continued)

OTHER PUBLICATIONS

International Search Report and Written Opinion in PCT/FR2015/052344 dated Dec. 3, 2015, with English translation.
(Continued)

*Primary Examiner* — Dale Moyer
(74) *Attorney, Agent, or Firm* — Womble Bond Dickinson (US) LLP

(57) ABSTRACT

The present invention concerns a method for switching, by a local processing unit (1,2) of a flight control system of an aircraft, configured to control at least one local actuator, connected to at least one local sensor and connected via at least one link (3,4) to an opposite processing unit (2,1) configured to control at least one opposite actuator and be connected to at least one opposite sensor, said local processing unit (1,2) being further configured to be connected to backup communication means (13,14) enabling data exchanges between the local processing unit (1,2) and the opposite processing unit (2,1) in the case of failures of the links connecting same (3,4), said backup communication means comprising an array of sensors or actuators (13)
(Continued)

Figure 1:
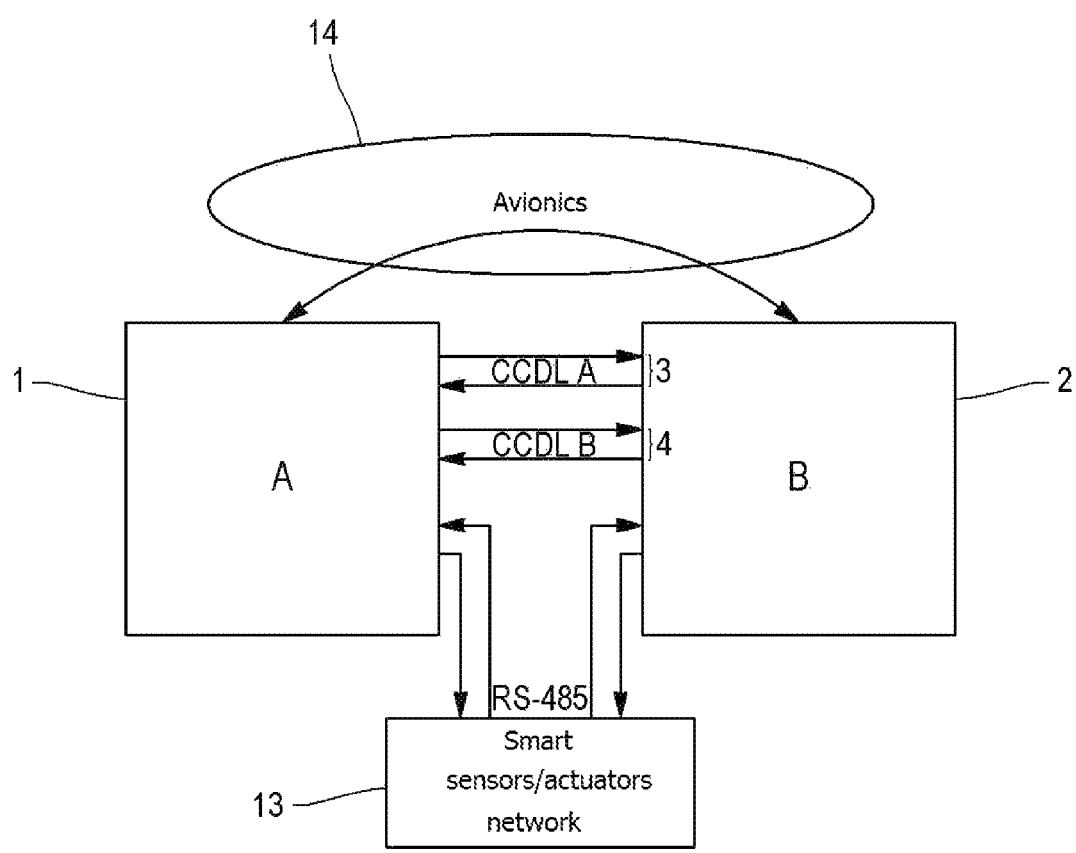

and/or a secure onboard network for the avionics (14), comprising steps of: •—sending, to the opposite processing unit (2,1), acquisition data relative to the at least one local sensor and actuator data relative to the at least one local actuator, •—receiving, from the opposite processing unit (2,1), acquisition data relative to the at least one opposite sensor and actuator data relative to the at least one opposite actuator, •—receiving an item of opposite health data and determining an item of local health data, •—switching said local processing unit (1,2) from a first state to a second state chosen from an active state (15), a passive state (16) and a slave state (18), depending on the opposite health data received and the local health data determined.

11 Claims, 5 Drawing Sheets

(51) Int. Cl.
*G06F 11/20* (2006.01)
*B64D 45/00* (2006.01)

(52) U.S. Cl.
CPC ...... *G06F 11/2033* (2013.01); *G06F 11/2097* (2013.01); *B64D 2045/0085* (2013.01); *G05B 2219/23316* (2013.01); *G05B 2219/24182* (2013.01); *G05B 2219/25144* (2013.01); *G05B 2219/25163* (2013.01); *G05B 2219/25174* (2013.01)

(58) Field of Classification Search
CPC ....... G05B 2219/34482; G06F 11/2028; G06F 11/2033
See application file for complete search history.

(56) References Cited

U.S. PATENT DOCUMENTS

| | | | |
|---|---|---|---|
| 2013/0079902 A1* | 3/2013 | Kamenetz | G05B 19/0421 700/82 |
| 2013/0124019 A1* | 5/2013 | Fukui | G06F 17/00 701/3 |
| 2013/0192560 A1* | 8/2013 | Nobelen | F02B 77/08 123/319 |
| 2016/0018793 A1* | 1/2016 | Becker | H04L 12/40176 701/3 |

FOREIGN PATENT DOCUMENTS

| | | |
|---|---|---|
| EP | 2595023 A2 | 5/2013 |
| EP | 2595023 A3 | 5/2013 |
| FR | 2986398 A1 | 8/2013 |

OTHER PUBLICATIONS

Search Report and Written Opinion in French Application No. 1458354 dated Jul. 23, 2015, with English translation coversheet.

\* cited by examiner

ность. This channel is called an active channel.
TWO-WAY ARCHITECTURE

GENERAL TECHNICAL FIELD

The invention relates to the field of flight control systems of aircraft.

It more particularly relates to a switching method between two processing units or computers making up a two-way architecture of such a system.

STATE OF THE ART

The onboard flight control systems fitting out aircraft such as existing airplanes or helicopters execute control functions and regulation functions of the engine of the aircraft ensuring proper operation of the latter. Such functions are critical for the safety of the passengers. Such systems therefore have to be resistant to failures.

For this, the existing flight control systems generally comprise two processing units or computers, each capable of ensuring proper operation of the engine. Such a system thus makes up a two way architecture in which each channel is capable of ensuring the execution of said critical functions in the case of a failure of the other channel. From among both of these channels, the control of the engine is generally given to the channel having the best health condition, i.e. the less failures or failures having the lowest degree of seriousness. This channel is called an active channel.

In order to execute the control and regulation functions of the engine, each of the channels is able to control at least one actuator. These actuators may fail. When one or several actuators of the active channel fail, the latter may no longer be capable of ensuring properly the control of the engine. If the other channel called passive channel is in a worst health condition as that of the active channel, it is then no longer able to ensure properly the control of the engine. Thus none of the two channels is capable of properly ensuring the control of the engine, the critical functions of the flight system may then no longer be ensured.

Therefore there exists a need for a method giving the possibility to the active channel of properly ensuring the control of the engine in spite of the failure of at least one of its actuators.

PRESENTATION OF THE INVENTION

The present invention thus relates according to a first aspect to a switching method applied by a first processing unit, called local processing unit, of a flight control system of an aircraft comprising at least one engine, said local processing unit being configured for controlling at least one actuator, called local actuator, so as to control the engine of the aircraft, and being able to be connected to at least one local sensor and to be connected via at least one link to a second processing unit, called opposite processing unit, configured for controlling at least one opposite actuator and being connected to at least one opposite sensor, said local processing unit being further configured so as to be connected to emergency communication means giving the possibility of ensuring exchange of data between the local processing unit and the opposite processing unit in the case of failures of said at least one link connecting them, said emergency communication means comprising a network of sensors or of actuators and/or an onboard secure network for avionics, said method comprising steps of:
sending to the opposite processing unit acquisition data relative to at least one local sensor and actuator data relative to the at least one local actuator,
receiving from the opposite processing unit acquisition data related to the at least one opposite sensor and actuator data relative to the at least one opposite actuator,
receiving a health datum relative to the health condition of the opposite processing unit, called opposite health datum,
determining from a health datum relative to the health of said local processing unit, said local health datum,
switching of said local processing unit from a first state to a second state, depending on said received opposite health datum and depending on said determined local health datum,
said steps for sending, receiving acquisition data and receiving a health datum being applied via said at least one link or said emergency communication means, and said states being from among an active state in which the local processing unit ensures the control of the engine of the aircraft, a passive state in which the local processing unit does not ensure control of the engine of the aircraft and a slave state in which the local processing unit yields to the opposite processing unit the control of said local actuators for the control of the engine of the aircraft.

Such a method gives the possibility to each processing unit to have a complete image of the global system, including actuators and sensors connected to the opposite processing unit, in order to be able to properly ensure the control of the engine in spite of the failure of a local actuator. A processing unit incapable of controlling the engine of the aircraft may thus give access to its actuators to the other processing unit which is in an active state, so that the flight control system may ensure the control of the engine in spite of one or several failures of the actuators of the active processing unit. Further, the use of emergency communication means gives the possibility of avoiding total blindness of the two-way system and a cutting out of the communications between both processing units. Finally, the use of such networks for exchanging information between the processing units gives the possibility of increasing the redundancy level of the communication means between the processing units and of ensuring the operating safety of the flight control system without however requiring the setting into place of additional communication means exclusively dedicated to the communication between the processing units.

The opposite processing unit and the local processing unit being connected via on the one hand a first bidirectional digital link and on the other hand, via a second bidirectional digital link and the opposite processing unit transmitting an opposite health datum on each of the links, the step for receiving an opposite health datum from the method according to the first aspect may comprise a step for receiving a first opposite health datum on the first link and a second redundant opposite health datum on the second link, a step for verifying the consistency of said first and second received health data, and a step for determining said opposite health datum transmitted according to said verification step.

This gives the possibility of reinforcing the detection capability by the system of the alterations of data exchange between the processing units and thus minimizes the failure probability of the flight control system.

The step for determining the transmitted opposite health datum may comprise, when said first and second received health data are not consistent, a consolidation step during which the transmitted opposite health datum is determined from data received over at least two successive frames.

This allows minimization of the risk of an error during the determination of the transmitted opposite health datum when the transmitted data over both links on a first frame are not consistent and do not allow determination of the transmitted health datum in a safe way.

In order to ensure that the received data have not been corrupted during their transmission, the step for receiving an opposite health datum of the method according to the first aspect may comprise a step for verifying the integrity of said received health datum.

The step for determining a local health datum of the method according to the first aspect may comprise a step for diagnosing the health condition relative to the hardware and to the software of said local processing unit.

This gives the possibility of obtaining a health datum allowing a diagnostic of the whole of the failures which may affect the capability of the local processing unit of ensuring the control of the engine.

The switching step of the method according to the first aspect may comprise:
- a step for determining, from the local health datum, a state datum relative to the state of said local processing unit and from a health status datum of the local processing unit relative to the capability of the local processing unit of ensuring control of the engine, and
- a step for switching said local processing unit into the slave state:
  - when the state datum indicates that the local processing unit is in a passive state and,
  - when the health status datum indicates a status in which:
    - the local processing unit is capable of communicating with the opposite processing unit, for example if at least one of the two bidirectional digital links gives the possibility of ensuring communications between the local processing unit and the opposite processing unit,
    - the local processing unit is incapable of ensuring the control of the engine,
    - and the local processing unit is capable of controlling the local actuators.

This gives the possibility of ensuring, before switching into the slave state, that the processing unit is not ensuring the control of the engine, that it is not capable of ensuring the control of the engine in the place of the other processing unit, and that the failures which affect it do not prevent it from giving access to its actuators to the other processing unit.

According to an advantageous and non-limiting feature, the switching step of the method according to the first aspect comprises:
- a step for determination, in which said local processing unit determines from said local and opposite health data that its health condition is better than that of the opposite processing unit,
- a waiting step in which said local processing unit waits for the opposite processing unit to switch into the passive state,
- a step for switching the local processing unit into the active state.

This gives the possibility of avoiding that the flight control system is found in a situation wherein both processing units would be active at the same time and would risk transmitting contradictory commands to their actuators.

The present invention relates according to a second aspect to a computer program product comprising code instructions for executing a switching method according to the first aspect when this program is executed by a processor.

The present invention relates according to a third aspect to a processing unit of a flight control system of an aircraft comprising at least one engine and configured for controlling at least one actuator, called local actuator, so as to control the engine of the aircraft,
said processing unit, said local processing unit, being able to be connected to at least one local sensor and to be connected via at least one link to a second processing unit, called opposite processing unit, configured for controlling at least one opposite actuator and being connected to the at least one opposite sensor, said local processing unit being further configured so as to be connected to emergency switching means giving the possibility of ensuring data exchanges between the local processing unit and the opposite processing unit in the case of failures of said at least one link connecting them, said emergency communication means comprising a network of sensors or actuators and/or an onboard secure network for avionics, and comprising:
- means for sending to the opposite processing unit acquisition data relative to the at least one local sensor and actuator data relative to the at least one local actuator,
- means for receiving from the opposite processing unit, acquisition data relative to the at least one opposite sensor and actuator data relative to the at least one opposite actuator,
- means for receiving a health datum relative to the health condition of the opposite processing unit, called opposite health datum,
- means for determining a health datum relative to the health of said local processing unit, called local health datum,
- means for switching said local processing unit from a first state to a second state, depending on said received opposite health datum and on said determined local health datum, said states being from among an active state in which the local processing unit ensures control of the engine of the aircraft, a passive state in which the local processing unit does not ensure the control of the engine of the aircraft and a slave state in which the local processing unit gives over to the opposite processing unit the control of said local actuators for controlling the engine of the aircraft.

The present invention relates according to a fourth aspect, to a flight control system comprising two processing units according to the third aspect and further comprising emergency communication means giving the possibility of ensuring the exchanges of data between the local processing unit and the opposite processing unit in the case of failures of the links connecting them, said emergency communication means comprising the network of sensors or actuators and/or the onboard secure network for avionics.

Such computer program product, processing unit and flight control system have the same advantages as those mentioned for the method according to the first aspect.

Both processing units may be connected via on the one hand a first bidirectional digital link and on the other hand via a second bidirectional digital link, said second link being redundant with the first link, and said first and second links being able to be active concomitantly.

Such a system has a great resistance to failures by the redundancy of its processing units and of its communication means as well as by the minimization of the number of communication links, while reducing its bulkiness.

The first and second links may be CCDL links ("Cross Channel Data Link").

Such a link notably gives the possibility to the processing units of exchange more complex pieces of health information than those exchanged via discrete analogue links of the known systems while limiting the wiring volume.

The onboard secure network for avionics may for example be a redundant Ethernet network of the AFDX ("Avionics Full DupleX switched Ethernet") or µAFDX type.

PRESENTATION OF THE FIGURES

Figure 2:
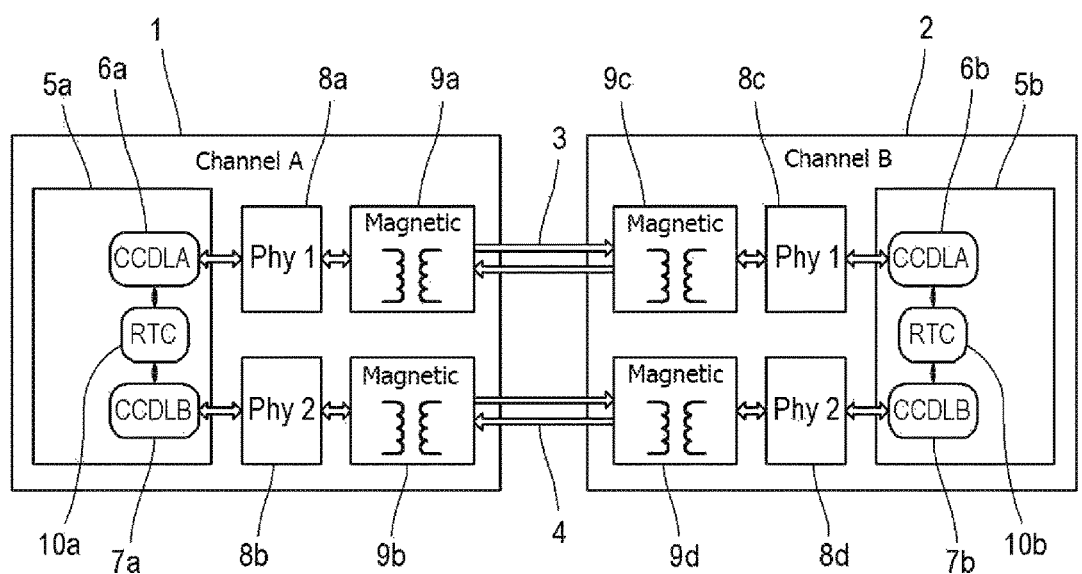
Figure 3:
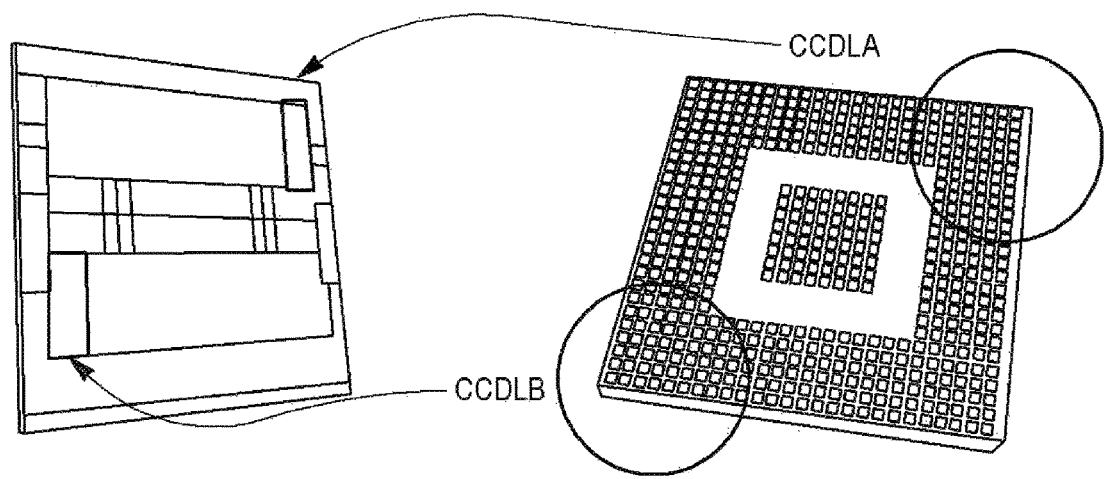
Figure 4:
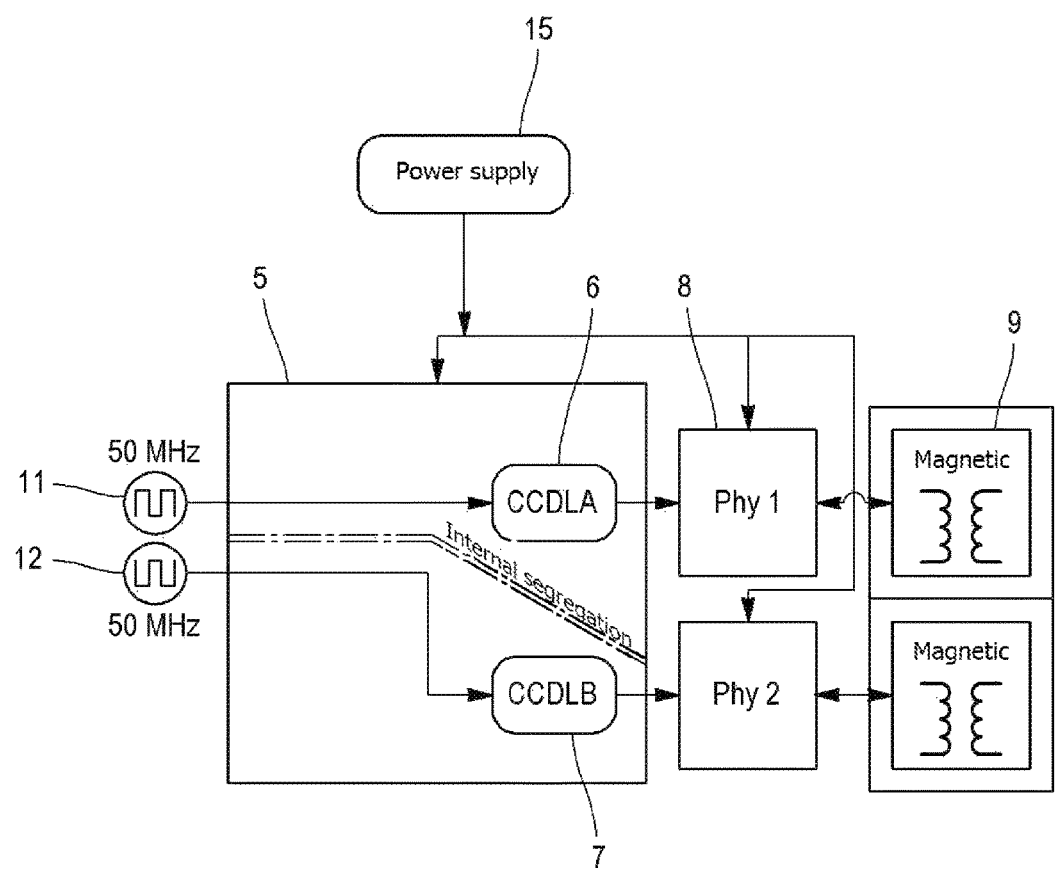
Figure 5:
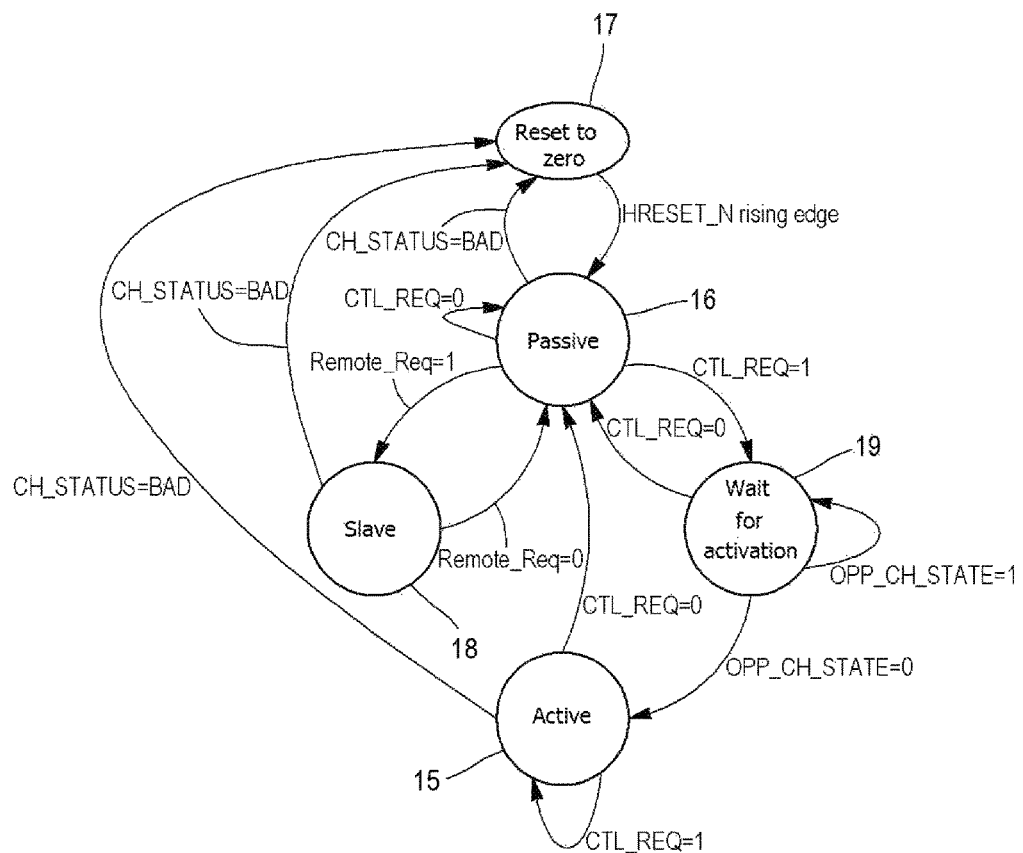

Other features and advantages will become apparent upon reading the description which follows of an embodiment. This description will be given with reference to the appended drawings wherein:

FIG. 1 schematically illustrates a flight control system according to an embodiment of the invention;

FIG. 2 schematically illustrates hardware means intended to establish two CCDL links between two processing units of a flight control system according to an embodiment of the invention;

FIG. 3 schematically illustrates the physical segregation of CCDL modules of each processing unit of a flight control system according to an embodiment of the invention;

FIG. 4 schematically illustrates the segregation of the hardware means of a processing unit intended to establish two CCDL links according to an embodiment of the invention;

FIG. 5 represents the graph of the states of the processing units of the flight control system according to an embodiment of the invention.

DETAILED DESCRIPTION

An embodiment of the invention relates to a switching method applied by a first processing unit 1, called local processing unit, of a flight control system, illustrated in FIG. 1, of an aircraft comprising at least one engine.

The flight control system also includes a second processing unit 2, called opposite processing unit. The local processing unit may be connected to at least one local sensor and be connected via at least one link 3, 4 to the opposite processing unit, itself connected to at least one opposite sensor. Both of the processing units are redundant and may each execute functions for controlling and regulating the engine of the aircraft. For this, each processing unit is configured for controlling at least one actuator, so as to control the engine of the aircraft. The actuators controllable by the local processing unit 1 are called local actuators. The actuators which may be controlled by the opposite processing unit are called opposite actuators. The system as illustrated in FIG. 1 thus is a two-way architecture comprising a channel A and a channel B.

The processing units 1 and 2 may be processors of a same multiprocessor computer system including several processors. In order to reinforce the resistance of the flight control system to external aggressions and to avoid that a single localized event may put both processing units 1 and 2 out of operation, both channels may be installed at a distance from each other in separate casings. In such a configuration, the processing units are not execution cores integrated within a single processor.

The system also comprises communication means giving the possibility of connecting both processing units in order to allow exchange of essential data for the proper operation of each of the processing units such as pieces of information on the health condition of the opposite processing unit.

In an alternative embodiment, these communication means are configured for establishing a first bidirectional digital link 3 and a second bidirectional digital link 4 between the first processing unit 1 and the second processing unit 2. Such a system does not include any discrete link between both processing units, which allows limitation of the complexity of its wiring and of the probability that one of the communication links fails.

The second link 4 is redundant with the first link 3 in order to ensure the communication between both processing units in the case of failure of the first link 3, and vice versa. Such redundancy guarantees, from the point of view of the exchange of information between both processing units, a good safety level.

Further, said first and second links may be active concomitantly. Thus, unlike the systems in which the redundant link is only used in the case of failure of the first link, the flight control system may use the first link 3 and the second link 4 at the same time during normal operation, i.e. in the absence of any failure of one of the two links, and may utilize the concomitant use of both of these links in order to verify the absence of corruption of the data exchanged between both processing units.

The first and second processing units 1 and 2 may use a procedure for communicating between them via both links 3 and 4, for example from among the protocols Ethernet IEEE 802.3, HDLC, SDLC, or any other protocol having a function for detecting or correcting an error. An Ethernet link may notably ensure high performances, large environmental robustness, notably as regards resistance to lightening and the Electro-Magnetic Compatibility ("EMC") and a high functional robustness by the application of mechanisms for controlling the integrity of data and for controlling the flow. Further, the Ethernet protocol is an industrial standard consistent with avionic communication technologies, such as AFDX ("Avionics Full DupleX switched Ethernet") or µAFDX, the maintenance techniques.

The first and second links may be CCDL links ("Cross Channel Data Link"). Such a link gives the possibility of synchronizing every application with an accuracy of less than one hundred microseconds. Such a link also allows, instead of exchanging discretes as in known systems, of exchanging pieces of health information constructed by the hardware or the software, information useful to the system (acquisition, statuses, . . . ) and functional data of the operating system (OS) and of the application system (AS).

Such CCDL links between both processing units A and B are illustrated in FIG. 2. Each processing unit 1, 2 comprises a system 5a, 5b, including a first CCDL module (CCDLA) 6a, 6b for establishing the first CCDL link 3 and a second CCDL module (CCDLB) 7a, 7b for establishing the second CCDL link 4. Such a system may appear as an on-chip system (SoC, "system on a chip") or consist of a microprocessor and peripherals implemented in separate casings or in an FPGA cardboard. Each CCDL module is connected to the input/output interface of its casing through a physical layer. Such a layer may for example comprise a hardware interface Phy 8a, 8b, 8c, 8d and a transformer 9a, 9b, 9c, 9d as illustrated in FIG. 2.

As illustrated in FIG. 3, the CCDL modules of each processing unit may be physically segregated by being positioned on the system 5a, 5b in distinct localizations and away from each other, for example by positioning each of them at a corner of a on-chip system. This gives the possibility of reducing the common failure probability in the case of an alteration of the SEU type ("Single Event Upset") or MBU ("Multiple Bit Upset").

According to a first alternative, each system 5a, 5b is powered by a separate power supply. According to a second alternative, the system comprises a power supply 15 common to the whole of the on-chip system. Each on-chip system may be powered through two distinct clock signals 11 and 12, as illustrated in FIG. 4. Thus, although they are not powered independently, the CCDL modules of each processing unit may be powered through independent clocks, which reinforces the resistance to failures of the on-chip system by preventing a clock failure of one of the CCDL modules from affecting the other CCDL module.

The CCDL modules of each processing unit may be synchronized by means of a local real time clock mechanism (HTR or RTC "Real time clock") 10a, 10b as illustrated in FIG. 2 and of a synchronization mechanism such as a mechanism with a synchronization window. Thus, in the case of loss of the synchronization, each processing unit operates by means of its local clock and then synchronizes again upon receiving a valid signal. The local clock mechanism is programmable by the application and its programming is protected against alternations of the SEU type ("Single Event Upset") or MBU ("Multiple Bit Upset"). The CCDL links may nevertheless continue to operate even in the absence of synchronization or in the case of loss of a clock.

The system may further comprise emergency communication means giving the possibility of ensuring exchanges of data between the first and second processing units and exclusively used in the case of failures of the first and second links, so as to avoid cutting-off of the communications between the processing units.

In a first embodiment illustrated in FIG. 1, these emergency communication means may comprise a network of sensors or actuators 13. Such a network of sensors or actuators may as an example be a network of smart sensors or actuators ("smart-sensor, smart-actuator"). Each processing unit may then be connected to this network 13 via a bus of the RS-485 type allowing transmission of information no longer in an analogue way but in a digital way.

In a second embodiment illustrated in FIG. 1, these emergency communication means comprise a secure network onboard for avionics 14. Such an on board secure network may as an example be a redundant Ethernet network such as AFDX ("Avionics Full DupleX switched Ethernet") or µAFDX. Such a network provides means for sharing resources, for segregating flows as well as determinism and availability required for aeronautical certifications.

The digital signals transmitted between the processing units may be sensitive to perturbations, mechanisms for controlling integrity and for controlling consistency of the transmitted data between both remote processing units may be set into place.

Thus, each processing unit may comprise means for verifying the integrity of the received data.

In order to verify the integrity of the received data, the different fields of each received frame may be verified, notably in the case of an Ethernet link, the fields relative to the destination address, to the source address, to the type and to the length of the frame, to the MAC data and to the filling data. A frame may be considered as non-valid if the length of this frame is not consistent with the length specified in the length de field of the frame or if the bytes are not integers. A frame may also be considered as non-valid if the redundancy control (CRC, "Cyclic Redundancy Check") calculated upon receiving the frame does not correspond to the CRC received because of errors, for example due to interferences during the transmission.

Further, when the local processing unit and the opposite processing unit are connected via two bidirectional links, each processing unit may comprise means for verifying subsequently to the transmission of a datum both over the first link and over the second link, the consistency of the received data on both links which should convey the same information in the absence of a failure or of corruption of the transmitted frames, and for determining the actually transmitted datum. When the data received over both links are not consistent, the processing unit may apply a consolidation step during which the actually transmitted datum is determined from data received on at least two successive frames, optionally over three frames. Such a consolidation may also be achieved by extending the time period which separates the reception of two successive Ethernet data packets, for example by setting the length of this time period to a duration greater than the duration of an electromagnetic perturbation. This may be applied by adding a parameter («Inter Frame Gap») setting such a period between the emitted packets. Such an application may for example give the possibility of avoiding corruption of two Ethernet packets transmitted in a redundant way.

Each of the processing units of the flight control system may be found in a state from among the following states, which is illustrated in the state graph in FIG. 5:
  an active state ("ACTIVE") 15 in which the processing unit ensures the control of the engine of the aircraft,
  a passive state ("PASSIVE") 16 in which the processing unit does not ensure control of the engine of the aircraft but executes other functions, for example diagnostic functions, and may optionally communicate with the other processing unit of the control system,
  a reset state ("RESET") 17 in which the processing unit is inactive and does not execute any function,
  a slave state ("SLAVE") 18 in which the processing unit gives over to the other processing unit, the control of its actuators for the control of the engine of the aircraft.

In order that each processing unit has a complete overview of the global system, including the actuators and sensors connected to the opposite processing unit, in order to be able to correctly ensure the control of the engine in spite of the failure of a local actuator, the switching method applied by a local processing unit comprises steps of:
  sending to the opposite processing unit acquisition data relative to the at least one local sensor and actuator data relative to the at least one local actuator,
  receiving from the opposite processing unit acquisition data relatively to the at least one opposite sensor and actuator data relative to the at least one opposite actuator.

Such acquisition data relative to a sensor may be, as an example in the case of sensors, temperatures comprising the temperature measured by the sensor.

Further, in order to allow the local processing unit 1 to change state from among the four states described above, the switching method comprises steps of:
  receiving a health datum such as a status, relative to the health condition of the opposite processing unit 2, called opposite health datum,
  determining a health datum relatively to the health of said local processing unit 1, called local health datum, switching of said local processing unit 1 from a first state to a second state, depending on said received opposite health datum and on said determined local health datum, said first and second states being from among the active, passive, reset and slave states described above.

Said steps for sending, receiving acquisition and reception data of a health datum are applied via links 3, 4 connecting both processing units or via emergency communication means 13, 14 in the case of a failure of the links 3, 4.

The received opposite health datum may be subject to perturbations, the step for receiving an opposite health datum may comprise a step for verifying the integrity of the received datum.

Moreover, mechanisms for verifying consistency may also be applied, the opposite health datum being able to be transmitted in a redundant way over the bidirectional links. The step for receiving an opposite health datum then comprises a step for receiving a first opposite health datum over the first link and of a second redundant opposite health datum over the second link, a step for verifying the consistency of said first and second received health data, and a step for determining said opposite health datum transmitted according to said verification step. Alternatively, the first opposite health datum received over the first link and the second opposite health datum received over the second link may be subject to a verification of integrity before verifying their consistency.

In the case of inconsistency of the data received over the two links, the local processing unit may ignore this health datum and wait for the transmission of a new opposite health datum. In the case of receiving inconsistent data over both links during two successive transmissions or more, the local processing unit may retain conservatively as an opposite health datum, the received datum indicating the worst health condition of the opposite processing unit if the received data during this first transmission are identical with those received during subsequent transmissions. Otherwise, the last received health datum in a consistent way is kept as long as no new health datum has been received consistently.

In order to determine a local or opposite health datum, the relevant processing unit makes a diagnostic of the health condition relative to its hardware and software elements. Such a diagnostic may be established from information obtained from different monitoring means ("monitoring") or from several registers. As an example, a register gives the possibility of obtaining the health condition of the hardware of the processing unit and another register gives the possibility of obtaining the health condition of the software of the processing unit.

The determined local health data or transmitted by the opposite processing unit are thus data giving the possibility of selecting a channel and of establishing a full system diagnostic. They may notably be diagnostic CCDL data, data of statuses of the operating system or of the applications, diagnostic data of the hardware, notably of sensors or actuators, functional diagnostic data produced by the software.

From a local or opposite health datum, the local processing unit may determine a state datum indicating the state, active, passive, slave or reset, in which is found the corresponding local or opposite processing unit, and a datum of the health status relative to the capability of the local or opposite processing unit of ensuring control of the engine.

According to an embodiment, each processing unit may have a health status from among the four following statuses:

- a status "GOOD" in which the processing unit does not have any failure,
- a status "ACCEPTABLE" in which the processing unit has certain failures which however will not prevent it from correctly ensuring the control of the engine, for example the breakage of a CCDL link transformer or the loss of the clock signal from one CCDL link,
- a status "SLAVE" in which the processing unit has too serious failures for giving it the possibility of correctly ensuring the control of the engine, for example a processor failure, but from controlling its actuators or of communicating with the opposite processing unit,
- a status "BAD" in which the processing unit is incapable of correctly ensuring control of the engine and has at least one hardware failure preventing the processing unit from controlling its actuators, for example a power supply or clock failure affecting the whole of the processing unit or a failure of both CCDL links.

The local processing unit executes at a regular time interval the steps described above for receiving an opposite health datum and for determining a local health datum. In order to determine whether it should change state, the local processing unit determines, from the local health datum, a local state datum indicating its state and a local status datum indicating its health status. Also, the local processing unit determines, from the opposite health datum, an opposite state datum indicating the state of the opposite processing unit, and an opposite status datum indicating the status of the opposite processing unit.

The local processing unit then carries out a comparison of its health condition, indicated by the local status datum, with that of the opposite processing unit, indicated by the opposite status datum.

If the local processing unit is in an active state and that its health condition remains better than that of the other processing unit (CTL_REQ=1), the processing unit remains in an active state and continues to ensure the control of the engine.

As an example, the health condition of the local processing unit is better than that of the opposite processing unit when:

- the local processing unit has the status GOOD and the opposite processing unit has a status from among the statuses ACCEPTABLE, SLAVE and BAD,
- the local processing unit has the ACCEPTABLE status and the opposite processing unit has a status from among the statuses SLAVE and BAD.

If the local processing unit is in an active state and if its health condition becomes not as good as that of the other processing unit (CTL_REQ=0), the local processing unit will switch into a passive state and will stop ensuring the control of the engine which is then ensured by the opposite processing unit.

As an example, the health condition of the local processing unit is not as good as that of the opposite processing unit when:

- the local processing unit has the ACCEPTABLE status and the opposite processing unit has the GOOD status, or
- the local processing unit has the SLAVE status and the opposite processing unit has a status from among the statuses GOOD and ACCEPTABLE, or
- the local processing unit has the BAD status and the opposite processing unit has a status from among the statuses GOOD and ACCEPTABLE.

If the local processing unit is in a passive state and if its health condition remains not as good as that of the opposite processing unit (CTL_REQ=0), the processing unit remains in a passive state.

If the local processing unit is in a passive state and if its health condition becomes better than that of the opposite processing unit (CTL_REQ=1), the local processing unit switches into an active state in order to ensure control of the engine instead of the opposite processing unit. The switching from a passive state to an active state may pass through a waiting state 19 in which the local processing unit waits for the opposite processing unit to pass into the passive state (OPP_CH_STATE=0) before passing into the active state and to take over the control of the engine. This gives the possibility of avoiding that the flight control system is found in a situation in which both processing units would be active at the same time and would risk transmitting contradictory commands to their actuators. The processing unit may remain in such a waiting state 19 as long as the opposite processing unit is active (OPP_CH_STATE=1). From this state, the local processing unit may even return into a passive condition if the health condition of the opposite processing unit has become again better than the health condition of the local processing unit (CTL_REQ=0) before the latter passes into an active state.

If the local processing unit is in a passive state and if the local status datum indicates that the processing unit has a health status of "SLAVE" (Remote Req=1), the local processing unit may switch into the slave state described above. According to an alternative, the switching into the slave state is also conditioned by receiving a signal for requesting access to the actuators of the local processing unit from the opposite processing unit. From the slave state, the processing unit may return to the passive state when the local status datum only indicates that the processing unit has a health status of "SLAVE" (Remote Req=0).

If the local status datum indicates a "BAD" health status, the local processing unit switches into the reset state regardless of its current state. Once the reset has been carried out successfully (HRESET_N rising edge), the processing unit may again pass into the passive state.

In the case when the local processing unit and the opposite processing unit have the same health status, GOOD or ACCEPTABLE, each processing unit may according to a first alternative remain in its current state, active or passive. According to a second alternative, it is possible to provide giving the control of the engine to a default processing unit, for example the first processing unit 1, in which case both processing units remain in their current state if the default processing unit is already in an active state, or else switch from the passive state to the active state and vice versa if the default processing unit was previously in a passive state.

A processing unit may switch from the ACCEPTABLE status to the GOOD status if it recovers the functions which it had lost previously but a processing unit having a SLAVE or BAD status cannot switch again into an ACCEPTABLE or GOOD status, unless it is reset.

Thus, the passive channel of the control system may switch into a state giving it possibility of making its actuators available to the active channel, which is in a better health condition, so that the flight control system may continue to ensure the control of the engine of the aircraft in spite of a failure affecting the capability of the active channel to control its own actuators.

The invention claimed is:

1. A switching method applied by a first processing unit, called local processing unit, of a flight control system of an aircraft comprising at least one engine, said local processing unit being configured for controlling at least one actuator, called local actuator, so as to control the engine of the aircraft, and being able to be connected to at least one local sensor and to be connected via at least one link to a second processing unit, called opposite processing unit, configured for controlling at least one opposite actuator and being connected to at least one opposite sensor, said local processing unit being further configured so as to be connected to emergency communication means giving the possibility of ensuring exchanges of data between the local processing unit and the opposite processing unit in the case of failures of said at least one link connecting them, said emergency communication means comprising at least one of a network of sensors, a network of actuators and an onboard secure network for avionics, said method comprising steps of:
sending to the opposite processing unit acquisition data relative to the at least one local sensor and actuator data relative to the at least one local actuator,
receiving from the opposite processing unit acquisition data relative to the at least one opposite sensor and actuator data relative to the at least one opposite actuator,
receiving a health datum relative to the health condition of the opposite processing unit, called opposite health datum,
determining a health datum relative to the health of said local processing unit, called local health datum,
switching of said local processing unit from a first state to a second state, depending on said received opposite health datum and on said determined local health datum, said steps of sending, receiving acquisition data and of receiving a health datum being applied via said at least one link or said emergency communication means, and said states being from among an active state in which the local processing unit ensures control of the engine of the aircraft, a passive state in which the local processing unit does not ensure the control of the engine of the aircraft and a slave state in which the local processing unit gives over to the opposite processing unit the control of said local actuators for controlling the engine of the aircraft, wherein the switching step comprises:
determining, from the local health datum, a state datum relative to the state of said local processing unit and from a health status datum of the local processing unit relative to the capability of the local processing unit of ensuring control of the engine, and
switching said local processing unit into the slave state:
when the state datum indicates that the local processing unit is in a passive state and,
when the health status datum indicates a status in which:
the local processing unit is capable of communicating with the opposite processing unit,
the local processing unit is incapable of ensuring the control of the engine,
and the local processing unit is capable of controlling the local actuators.

2. The method according to claim 1, wherein
the opposite processing unit and the local processing unit being connected via on a first bidirectional digital link and via a second bidirectional digital link,
and the opposite processing unit transmitting an opposite health datum over each of the links,
the step of receiving an opposite health datum comprises receiving a first opposite health datum over the first link and a second redundant opposite health datum over the second link, verifying consistency of said first and second received health data, and determining said opposite health datum transmitted depending on said verification.

3. The method according to claim 2, wherein determining the transmitted opposite health datum comprises, when said first and second received health data are not consistent, a consolidation step during which the transmitted opposite health datum is determined from data received over at least two successive frames.

4. The method according to claim 1, wherein receiving an opposite health datum comprises verifying integrity of said received health datum.

5. The method according to claim 1, wherein determining a local health datum comprises diagnosing the health condition relative to the hardware and to the software of said local processing unit.

6. The method according to claim 1, wherein the switching step comprises:
a determination step, in which said local processing unit determines from said local and opposite health data that its health condition is better than that of the opposite processing unit,
a waiting step in which said local processing unit waits for the opposite processing unit to switch into the passive state,
switching the local processing unit into the active state.

7. A computer program product comprising non-transitory code instructions for executing a switching method according to claim 1 when this program is executed by a processor.

8. A flight control system comprising two processing units of a flight control system of an aircraft comprising at least one engine, each processing unit configured for controlling at least one actuator, called local actuator, so as to control the engine of the aircraft,
said processing unit, called local processing unit, being able to be connected to at least one local sensor and to be connected via at least one link to a second processing unit, called opposite processing unit, configured for controlling at least one opposite actuator and being connected to at least one opposite sensor, said local processing unit being further configured so as to be connected to emergency communication means giving the possibility of ensuring exchanges of data between the local processing unit and the opposite processing unit in the case of failures of said at least one link connecting them, said emergency communication means comprising at least one of a network of sensors, a network of actuators and an onboard secure network for avionics,
and wherein the processing unit is further configured to:
send to the opposite processing unit acquisition data relative to the at least one local sensor and actuator data relative to the at least one local actuator,
receive from the opposite processing unit, acquisition data relative to the at least one opposite sensor and actuator data relative to the at least one opposite actuator,
receive a health datum relative to the health condition of the opposite processing unit, called opposite health datum,
determining a health datum relative to the health of said local processing unit, called local health datum,
wherein the processing unit further comprises a switch for switching said local processing unit from a first state to a second state, depending on said received opposite health datum and on said determined local health datum,
said states being from among an active state in which the local processing unit ensures control of the engine of the aircraft, a passive state in which the local processing unit does not ensure the control of the engine of the aircraft and a slave state in which the local processing unit gives over to the opposite processing unit the control of said local actuators for controlling the engine of the aircraft,
further comprising the emergency communication means giving the possibility of ensuring exchanges of data between the local processing unit and the opposite processing unit in the case of failures of the links connecting them, said emergency communication means comprising the network of sensors or actuators and/or the onboard secure network for avionics.

9. The flight control system according to claim 8, wherein both processing units are connected via a first bidirectional digital link and via a second bidirectional digital link, said second link being redundant with the first link, and said first and second links being able to be active concomitantly.

10. The flight control system according to claim 9, wherein the first and second links are CCDL ("Cross Channel Data Link") links.

11. The flight control system according to claim 8, wherein the onboard secure network is a redundant Ethernet network of the AFDX ("Avionics Full DupleX switched Ethernet") or µAFDX type.

* * * * *